(12) United States Patent
Warner

(10) Patent No.: US 7,350,726 B1
(45) Date of Patent: Apr. 1, 2008

(54) METHOD OF CONVERTING COTTON WASTE TO MULCH

(75) Inventor: Lee A. Warner, Raleigh, NC (US)

(73) Assignee: Cotton Resources, LLC, Raleigh, NC (US)

( * ) Notice: Subject to any disclaimer, the term of this patent is extended or adjusted under 35 U.S.C. 154(b) by 167 days.

(21) Appl. No.: 11/202,303

(22) Filed: Aug. 11, 2005

(51) Int. Cl.
*B02C 19/00* (2006.01)

(52) U.S. Cl. .......................... 241/23; 241/25

(58) Field of Classification Search ................. 241/23, 241/65, 25
See application file for complete search history.

(56) References Cited

U.S. PATENT DOCUMENTS

| 4,426,753 A | 1/1984 | Oellers et al. |
| 6,383,548 B1 | 5/2002 | Holt et al. |
| 6,692,615 B1 | 2/2004 | Cathey |

*Primary Examiner*—Mark Rosenbaum
(74) *Attorney, Agent, or Firm*—Coats & Bennett, P.L.L.C.

(57) ABSTRACT

Cotton waste is transferred to a heated reactor and mixed with a pigment in the presence of steam. Cotton waste is converted to mulch by a plurality of rotating mixing elements disposed in the reactor and which mix, cut and/or chop the cotton waste therein. In particular, the reactor includes a cylindrical wall section and a longitudinal drive shaft extending through the reactor. A series of radial arms extend from the drive shaft. Mounted on the terminal ends of the radial arms is a first set of mixing elements. As the drive shaft is driven, these mixing elements move adjacent the inner surface of the cylindrical wall section. Further, there is provided a second set of mixing elements disposed adjacent the inner face of the cylindrical wall section. These rotary mixing elements are secured to a shaft that extends through the cylindrical wall section at an angle to the longitudinal drive shaft. The second set of mixing elements cooperate with the first set of mixing elements to cut or chop and transform the cotton waste into mulch.

19 Claims, 2 Drawing Sheets

METHOD OF CONVERTING COTTON WASTE TO MULCH

FIELD OF THE INVENTION

The present invention relates to processes for forming mulch, and more particularly to a process for transforming cotton waste to mulch.

BACKGROUND OF THE INVENTION

It is known to convert cotton waste to mulch. Probably the most common process for converting cotton waste to mulch is by an extrusion process. Cotton waste is directed into a mixer where the cotton waste is mixed with a pigment and other components. After the cotton waste has been mixed it is directed into an extruder which includes an elongated tube having an auger rotated therein. The pitch of the auger becomes progressively smaller from the inlet end of the extruder to the outlet end thereof. Thus, as the cotton waste is augered from the inlet to the outlet, the variation in pitch will compress the cotton waste and generates heat in the process. Eventually, the formed mulch is sprayed or directed out the outlet of the extruder. This extrusion process is inefficient and expensive.

One of the major drawbacks to this extrusion process is the huge energy requirements per pound of mulch product produced. For example, it is believed that a 150 horsepower motor operating the auger will only produce about 1,000 lbs. of mulch per hour. In addition, this extrusion process has the disadvantage of resulting in substantial wear and tear on the extruder and particularly the auger and barrel. This wear and tear makes the extruder difficult and expensive to repair and maintain.

Therefore, there has been and continues to be a need for an efficient and cost effective process for converting cotton waste to mulch.

SUMMARY OF THE INVENTION

The present invention entails a method of converting cotton waste to mulch. Cotton waste is transferred into a mixing chamber and mixed with a pigment and/or a binder. The mixing is carried out by one or more rotary mixing elements that rotate within the mixing chamber.

In one particular embodiment, steam is injected into the reactor and one or more pigments are mixed with the cotton waste causing the fibers of the cotton waste to be colored.

In one example, cotton waste is transferred into the reactor. While in the reactor, the cotton waste is moved outwardly towards a cylindrical wall section that forms a part of the reactor. During this process cotton waste is converted to mulch by mixing the cotton waste by the cooperative action of first and second mixing elements, the first mixing element rotating about one axis and around the reactor in close proximity to the cylindrical wall section, and the second mixing element rotating about a second axis that extends at an angle to the first axis and disposed adjacent the cylindrical outer wall such that cotton waste passing between the two mixing elements is mixed by the cooperative action of the two mixing elements.

Other objects and advantages of the present invention will become apparent and obvious from a study of the following description and the accompanying drawings, which are merely illustrative of such invention.

DESCRIPTION OF THE INVENTION

Figure 1:
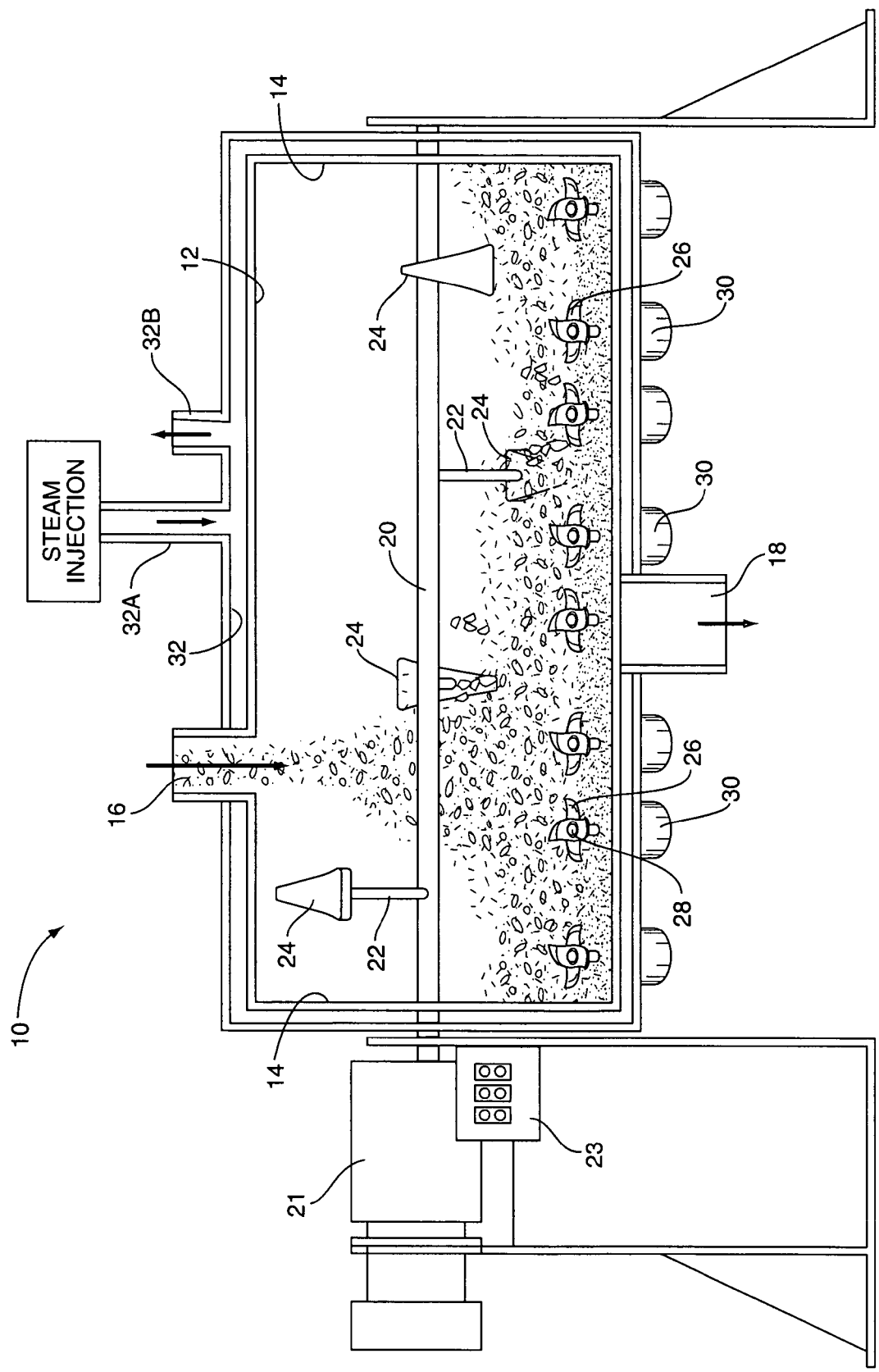
FIG. 1 is a longitudinal cross sectional view of a reactor illustrating how cotton waste contained in the reactor is converted to mulch.
Figure 2:
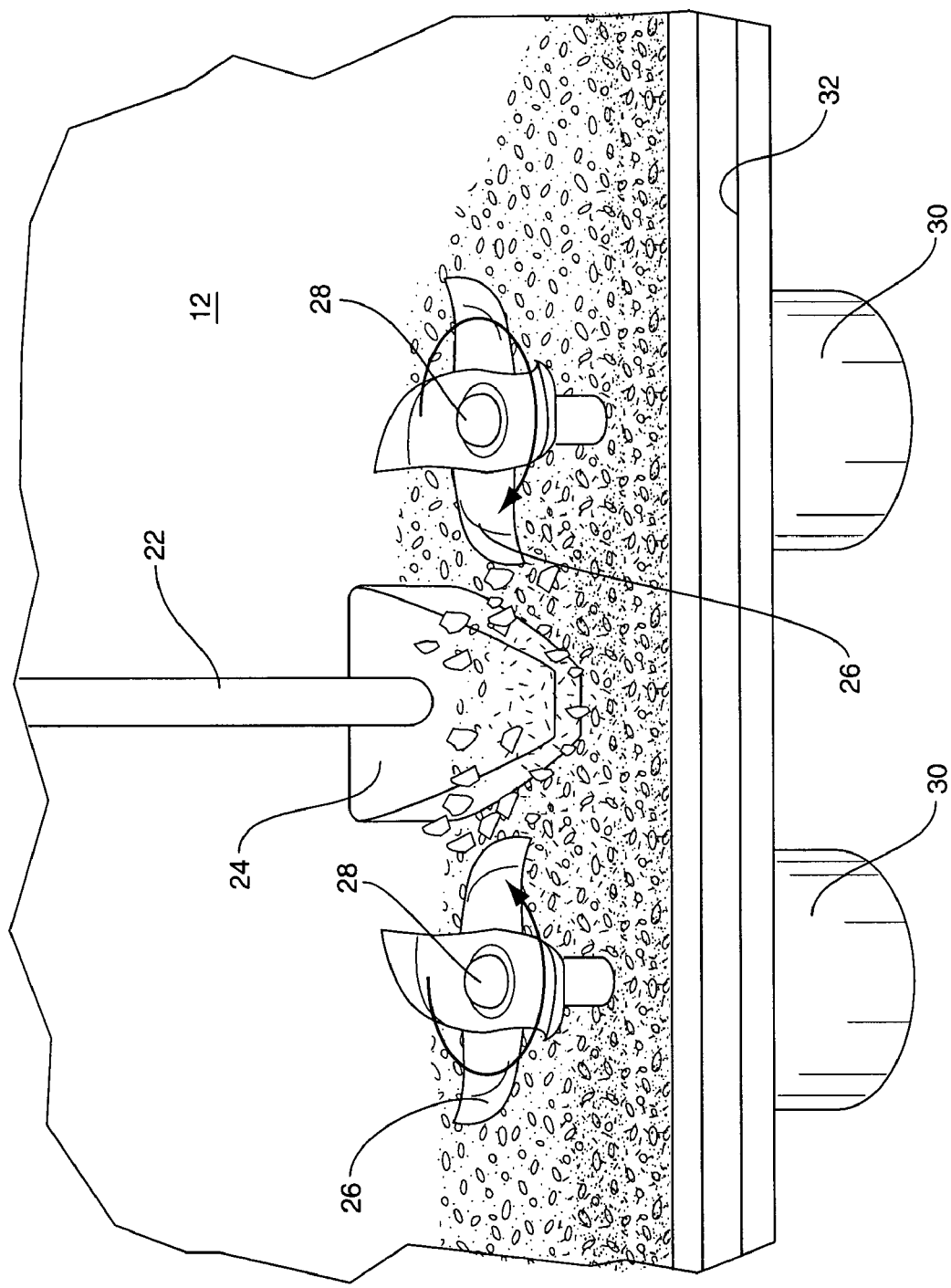
FIG. 2 is a fragmentary perspective view illustrating how first and second rotary mixing elements cooperate to mix, cut or chop the cotton waste.

The present invention entails a process or method for converting conventional cotton waste to mulch. Cotton waste is a term that generally describes waste that results from the ginning of cotton, mill waste or any other waste product that is derived from cotton. In the process of the present invention, the cotton waste is fed into an inlet of a reactor or mixing chamber. The reactor can be heated. For example, the reactor can be provided with an outer jacket for receiving steam or heated oil. The steam or heated oil will, in turn, be circulated through the heated jacket and the heat associated with the steam or heated oil will be transferred internally to a chamber area defined in the reactor.

Once the cotton waste has been transferred into the reactor, the cotton waste will be mixed thoroughly. It is contemplated that steam could be injected into the reactor along with color pigments to dye or color the fiber associated with the cotton waste. Various types of color pigments can be utilized. For example, colored pigments in a liquid or dry form may be aggressively mixed with the cotton waste. In addition, a binder can be mixed with the cotton waste.

Inside the reactor or mixing chamber, there is typically provided one or more rotating elements, referred to as mixing elements. These rotating elements rotate internally within the reactor, engaging the cotton waste, moving the cotton waste throughout the reactor, and in the process, mixing the cotton waste with the pigment and/or binder.

Temperature within the reactor can be controlled. While the temperature can vary, it is contemplated that a temperature range of 175° to 280° F. would be effective in facilitating the destruction of undesirable weed seed by heat and/or chopping by the rotating elements of the reactor.

Generally, cotton waste has a moisture content of approximately 15%. Of course, the moisture content for cotton waste transferred into the reactor can vary depending on the environmental conditions that the cotton waste was exposed to prior to being transferred into the reactor. In any event, it is desirable for the produced mulch to have a moisture content of less than 12%. There are a number of reasons for this, one of which pertains to the fact that mulch is sometimes packaged in plastic bags, and with a moisture content of 12% or less, it is not anticipated that there would be any significant growth or proliferation of microorganisms, toxins, mold and fungi. As noted above, it is contemplated that in some processes steam would be injected into the reactor. However, at a steady state condition there should be little, if any, absorption of moisture from the steam because the temperature of the steam within the reactor should equal or exceed the temperature of the heating fluid or gas in the outer jacket of the reactor.

The length of the fibers can be controlled by controlling the moisture content of the cotton waste mixture. By adding water or moisture to the waste cotton the length of the cotton fibers can be maintained. Accordingly, one would anticipate that a very dry cotton, cotton waste or fiber mix would result in relatively short fibers because dry fibers are easier to chop. In addition, the fiber length can be controlled by the residency time in the reactor. The longer the residency time, the finer or shorter the length of the fibers.

Optionally, a binder, such as a wax emulsion, acrylic emulsion or a starch, can be added to the cotton waste mix within the reactor. A binder will cause dust particles to stick and adhere to the fibers and cause the pigment to adhere to the fibers. This is a manner of effectively dealing with the substantial amount of dust that can be present in certain types of cotton waste. In this regard, one is referred to the disclosure of U.S. Pat. No. 6,383,548. The disclosure of this patent is expressly incorporated herein by reference. This patent suggests that a gellable polysaccharide can be added as a lubricant to a cotton waste mixture.

Shown in FIG. 1, in schematic form, is a reactor or mixing chamber 10 of the type that can be used to convert cotton waste to mulch. A brief review of the reactor 10 follows.

Reactor 10 comprises a cylindrical wall section or structure 12 having a pair of opposed ends 14. Defined within the bounds of the cylindrical wall section 12 and ends 14 is an internal chamber that receives and holds the cotton waste during the conversion process. Inlet 16 permits cotton waste to be fed into the reactor. Disposed about the bottom of reactor 10 is an outlet 18 that includes an openable door or hatch that permits the resulting mulch to be conveyed or directed from the reactor 10.

Disposed internally within the reactor 10 is a series of rotary elements. These rotary elements move within the reactor 10, and in the process engage cotton waste and mix, cut or chop the cotton waste and in the process, convert or transform the cotton waste to mulch. As the rotary elements are rotated the cotton waste and parts thereof tend to become airborne within the confines of the reactor.

Turning particularly to the rotary elements and the drive systems therefore, reactor 10 is provided with a central or longitudinal drive shaft 20. Drive shaft 20 is driven by a motor 21 that is supported exteriorly of the reactor 10. As shown in FIG. 1, a control panel 23 is provided for controlling the motor 21, and hence the drive shaft 20. Secured in axial spaced apart relationship on the drive shaft 20 is a series of radial arms 22. Each radial arm is connected or secured to the drive shaft 20 and extends radially outwardly. Secured to the terminal ends of the respective arms 22 is a series of mixing elements 24. Mixing elements 24 are preferably connected to the radial arms 22 such that the angular orientation of the mixing elements 24 can be adjusted with respect to the arms 22. In the embodiment illustrated herein, each respective mixing element includes a pointed leading end and a pair of sides that extend to a back. The bottom of each mixing element may be rounded to generally conform to the curvature of the cylindrical wall section 12. In one embodiment, the rounded bottom of the mixing elements 24 would be spaced in close proximity to the interior of the cylindrical wall section 12 of the reactor 10. Mixing elements 24 can conform to other shapes and configurations. The mixing elements 24, as shown in the drawings, are merely examples of mixing or rotating elements that can be used to mix, cut or chop the cotton waste.

The mixing elements 24 disclosed in FIG. 1 are generally of the type referred to as plow mixers. Typically the drive shaft 20 rotates at high speed producing a plow tip speed of more than 700 feet per minute. This can result in a fluidizing action in the reactor or mixing chamber. In some cases, plow mixers, such as disclosed in FIG. 1, throw the cotton waste upward and the cotton waste settles in random patterns. The shape of a plow mixer may aid in material movement towards the center discharge 18. It is contemplated that the mixing action of plow mixers, like shown in FIG. 1, can blend the cotton waste, pigment and/or binder in less than five minutes with a substantial homogeneity.

A second set of rotary elements is also provided. In this case, as viewed in FIG. 1, the second set of rotary elements includes a series of rotating elements 26 that are secured to shafts 28 that extend through the cylindrical wall section 12 and which are driven by a motors 30 secured exteriorly of the reactor 10. In the case of the embodiment illustrated in FIG. 1, a pair of elements 26 is secured to each shaft 28. While the respective elements 26 rotate with the drive shafts 28, the elements 26 lie and remain in one area of the reactor. The respective elements 26 rotate over an area adjacent the interior of the cylindrical wall 12. Note also that the axis of the drive shafts 28 extend at an angle with respect to the axis of the drive shaft 20. The individual sets of elements 26 are spaced such that they lie adjacent the rotating paths of the elements 24. That is, as the respective elements 24 rotate about the axis of the drive shaft 20, upon each revolution, an element 24 passes between two sets of elements 26. In one particular embodiment, the elements 24 pass in close relationship to the elements 26. In this embodiment, the elements 26 would be rotated counter to the direction of movement of the elements 24. Thus, a cooperative mixing, cutting or chopping action occurs between the respective elements 24 and 26. That is, for example, as one element 24 passes adjacent and between two sets of elements 26, the cotton waste lying between and in the vicinity of the elements 24 and 26 is cut and/or chopped by the elements 24 or 26 or by the cooperative action of the elements 24 and 26.

As discussed above, the angle or orientation of the respective elements 24 can be adjusted with respect to the arms 22. In one exemplary process, involving four elements 24, two outer elements and two intermediate elements, the outer elements can be angled so as to urge the cotton waste and mixture inwardly towards the two intermediate elements 24. The two intermediate elements 24 can be angled or oriented to urge the cotton waste and mixture outwardly towards the outer elements 24. Thus, in this example, as viewed in FIG. 1, it is contemplated that the cotton waste mix is continuously moved back and forth across the reactor. That is, the cotton waste tends to move from the central area of the reactor 10 to an area around the outer elements 24, and from the outer elements 24 back towards and over the intermediate elements 24.

As used herein, the elements 24 and 26 are sometimes referred to as rotary mixing elements. The term "rotary mixing element" is meant to encompass an element, blade or knife that mixes, cuts or chops the cotton waste. In one case, the rotary mixing elements may include relatively sharp cutting blades or knives that cut the cotton waste and which may also contribute a mixing action. In other cases, the rotary mixing elements may include blunt or relatively dull fingers, blades or knives that mix the cotton waste, pigment and/or binder, and which may also perform some cutting or chopping action.

The mixing elements, when in the form of knives or choppers, add aggressiveness to the mixing action to enable the uniform aggregation of pigments and binders at reduced moisture levels. When using cutting knives or cutting blades then, as discussed above, the fiber length can be reduced. In some cases fiber length may not be desirable depending on the specific application of the mulch material. If less cutting action is desired from the mixing elements, then a change can be made to the type of mixing elements utilized, particularly with respect to the mixing elements 26. That is, a more blunt edge can be used on the leading edge of these elements.

One of the advantages of the present invention is that the aggressive mixing action brought about by the mixing elements 24 and 26 makes a homogeneous application of binders, pigments, water absorption modifiers and other additives that might be added to the mix to improve the performance of the mulch and/or soil coverage. It should be noted that there is an incentive to reduce the moisture added to a minimum in order to reduce the energy necessary to produce a mulch material of less than 12% moisture, so that material loss is due to microbiological attack in the package material can be minimized.

Reactor 10 may be provided with a number of other inlets. For example, reactor 10 may be provided with a steam inlet and any number of auxiliary inlets for permitting components, such as pigments, to be directed into the reactor. Reactor 10 shown in FIG. 1 is a batch reactor. However, it will be appreciated that the reactor 10 may be a continuous reactor where material would be continuously moving through the reactor.

In order to heat reactor 10, the reactor is provided with an outer jacket 32. Outer jacket 32 is adapted to enable steam, heated oil, or other heat mediums to be directed into and through the jacket 32. Heating jacket 32 includes an inlet 32A and an outlet 32B. It is appreciated that heat associated with the heating medium contained within the jacket 32 can be transferred inwardly into the reactor 10. It is noted also that the reactor or mixing chamber 10 does not have to be heated. If heat is desired, the heating step can take place outside the reactor or the mixing chamber.

Details of the reactor 10 are not dealt with herein because such is not per se material to the present invention, and further reactors of the type described are known and commercially available. For example, Littleford Day, Inc. of Florence, Ky. produces a batch mixer, Model FM-130D(1Z). It is contemplated that mixers of this type could be utilized to treat cotton waste and convert cotton waste to a mulch product in accordance with the process described herein.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of converting cotton waste to mulch comprising:
   a. transferring cotton waste into a reactor;
   b. mixing the cotton waste with a pigment and/or a binder in the reactor by the mixing action of one or more rotary mixing elements that move through the reactor; and
   c. wherein the mixing of the cotton waste with the pigment and/or binder within the reactor forms the mulch; and
   d. wherein the rotary mixing elements include one or more choppers that chop the cotton waste, and wherein the one or more choppers are driven by one or more motors positioned outside the reactor and having one or more drive shafts that extend through the wall of the reactor.

2. The method of converting cotton waste to mulch of claim 1 wherein both a pigment and a binder are mixed with the cotton waste.

3. The method of converting cotton waste to mulch of claim 1 including heating the reactor.

4. The method of converting cotton waste to mulch of claim 1 wherein the rotary mixing elements cut the cotton waste by a cooperative action between the first and second rotary cutting elements.

5. The method of converting cotton waste to mulch of claim 1 including injecting steam into the reactor or heating the reactor.

6. The method of converting cotton waste to mulch of claim 1 including adding water or moisture to the cotton waste.

7. The method of converting cotton waste to mulch of claim 1 wherein the cotton waste includes fibers and wherein the method includes controlling the length of the fibers by controlling the moisture content of the cotton waste within the reactor.

8. The method of converting cotton waste to mulch of claim 1 wherein the cotton waste comprises fibers and the method includes controlling the length of the fibers by controlling the residency time of the cotton waste within the reactor.

9. The method of converting cotton waste to mulch of claim 1 including controlling the temperature within the reactor to a temperature range of 175° to 280° F.

10. The method of converting cotton waste to mulch of claim 1 including heating the reactor by injecting steam or heated oil into a jacket associated with the reactor.

11. The method of converting cotton waste to mulch of claim 1 including mixing a binder with the waste cotton wherein the binder causes particles of the cotton waste to adhere to each other.

12. The method of converting cotton waste to mulch of claim 11 including binding dust particles associated with the cotton waste by mixing the binder with a cotton waste.

13. A method of converting cotton waste to mulch comprising:
   a. transferring cotton waste into a reactor;
   b. moving the cotton waste outwardly towards a cylindrical wall section that forms a part of the reactor; and
   c. converting the cotton waste to mulch by mixing the cotton waste with a pigment and/or a binder by the cooperative action of first and second mixing elements, the first mixing element rotating about a first axis and around the reactor in close proximity to the cylindrical wall section, and the second mixing element rotating about a second axis that extends at an angle to the first axis and disposed adjacent the cylindrical outer wall such that cotton waste passing between the two mixing elements is mixed by the cooperative action of the two mixing elements.

14. The method of claim 13 wherein the first mixing element forms a part of a series of mixing elements that are rotatably driven about the first axis, and wherein the second mixing element forms a part of a series of second mixing elements that are rotated about the second axis.

15. The method of claim 13 wherein one mixing element moves the cotton waste to the other mixing element and the two mixing elements cooperate to mix the cotton waste with the pigment and/or binder.

16. The method of claim 13 wherein the first axis extends longitudinally through the reactor and the second axis extends through the cylindrical wall section; and wherein the second mixing element is driven by an electric motor dispose exteriorly of the cylindrical section.

17. The method of converting cotton waste to mulch of claim 13 wherein at least one of the mixing elements chops the cotton waste.

18. A method of converting cotton waste to mulch comprising:
   a. transferring cotton waste into a mixing chamber;
   b. mixing at least one pigment and a binder with the cotton waste in the mixing chamber;
   c. mixing the cotton waste, pigment and binder including rotating at least one rotary mixing element in the mixing chamber and engaging the cotton waste with the rotary mixing element and mixing the cotton waste with the pigment and binder to form the mulch; and
   d. wherein the mixing chamber is provided with at least two rotary mixing elements with each mixing element being rotatable about a separate axis and wherein the two mixing elements act to mix the cotton waste with the pigment and binder.

19. The method of converting cotton waste to mulch of claim 18 wherein the two mixing elements cooperate to mix the cotton waste, pigment and binder.

* * * * *